I. & S. GEFTER.
PERCOLATOR.
APPLICATION FILED APR. 12, 1911.
1,047,402.
Patented Dec. 17, 1912.
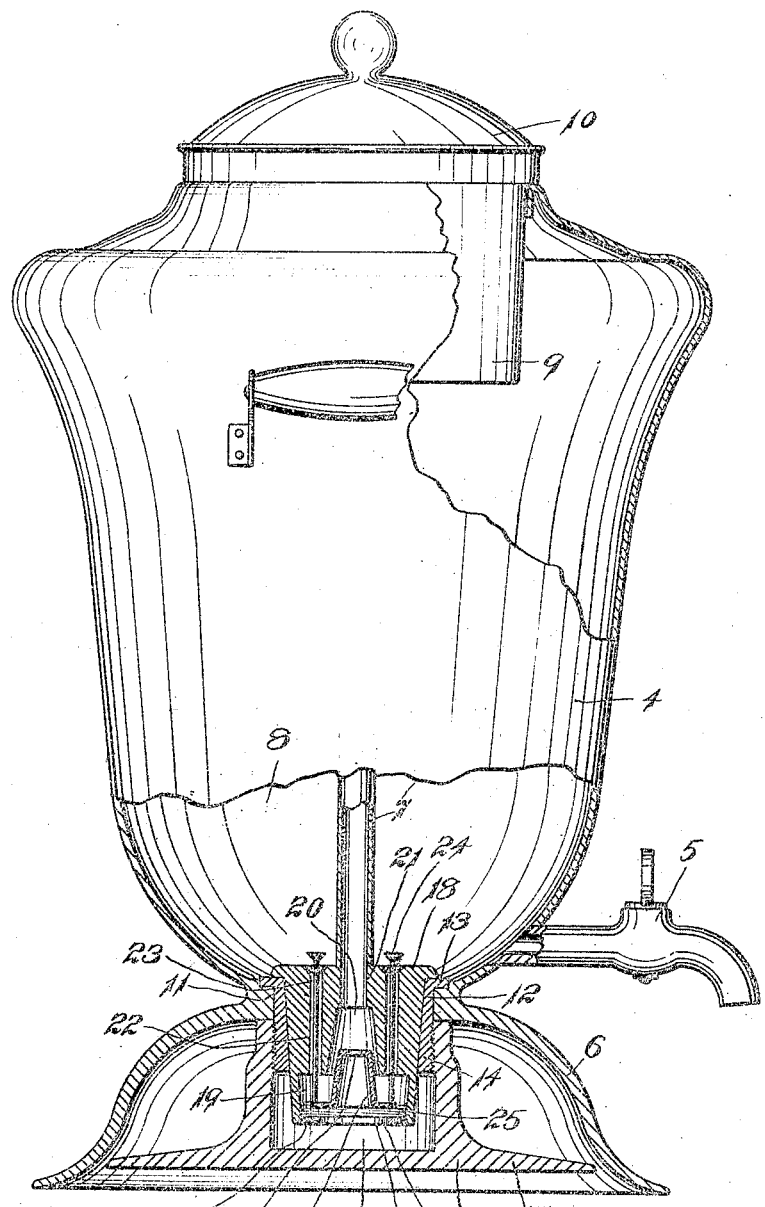

UNITED STATES PATENT OFFICE.

ISRAEL GEFTER AND SAMUEL GEFTER, OF MERIDEN, CONNECTICUT.

PERCOLATOR.

1,047,402.  Specification of Letters Patent.  Patented Dec. 17, 1912.

Application filed April 12, 1911. Serial No. 620,647.

*To all whom it may concern:*

Be it known that we, ISRAEL GEFTER and SAMUEL GEFTER, each a subject of the Czar of Russia, and each a resident of Meriden, in the county of New Haven and State of Connecticut, have invented a new and Improved Percolator, of which the following is a specification.

Our invention relates to that class of devices employed for preparing coffee and like beverages, and especially to that class in which a liquid, as water, is supplied to and percolates through the coffee or like material from which the beverage is being made, and the object of our invention, among others, is to provide a device of this class that will begin to operate in a minimum length of time, and one in which the supply of liquid to the coffee or other material may be regulated to produce the most efficient results.

Other objects to be derived from our improved apparatus will appear from the accompanying description taken in connection with the accompanying drawings, in which—

The figure is a view in elevation of an urn embodying our invention, with parts broken away in central section to show the construction.

While our invention may be embodied in many of the different forms of percolating devices in use at the present time, we have selected for the purpose of illustrating our invention herein a coffee urn in which the numeral 4 denotes the body of an urn composed of any suitable material and of any desired shape, the illustration showing one round in form in cross section and provided with a spout or faucet 5 through which the contents may be obtained from the vessel. A base 6 serves as a support for the urn or vessel and a fountain tube 7 projects upward through the chamber 8 in the urn to the interior of a basket 9 supported at the upper part of the urn, and having a cover 10. The location and arrangement of the upper end of the tube 7 in the basket or holder 9 may be the same as in many of the constructions of devices of this class at the present time, the upper end of the tube being located at some distance above the perforated bottom of the basket or holder 9, so that as the liquid is ejected from the mouth of the tube it will fall over the coffee or other material held by the basket and percolate through this material and through the bottom of the basket into the chamber 8 to be again forced upward. This construction and operation being well known a further description is deemed unnecessary herein, and especially as it forms no part of our present invention.

An opening 11 extends through the bottom of the urn into the space inclosed by the base 6 and a bushing 12 is located in this opening, this bushing having a lip 13 resting against the bottom of the chamber in the urn and a screw threaded outer end 14. A heating plate 15 has a recess extending from its upper end into the body of the plate, the mouth of this recess being threaded to fit the threaded end of the bushing 12 and the lower part of the recess forming a heating chamber 16. The parts are thus held in engagement, the plate 15 being screwed upon the bushing until its upper edge abuts against the inner surface of the upper part of the inclosure in the base 6, the bushing 12 being thus tightly drawn to place and the parts being thus firmly secured. Any additional means for packing the joint may be employed if such shall be desired. The plate 15 has a flange 17 common to devices of this kind as a means of increasing the heating surface.

The opening through the bushing is preferably tapered from a larger dimension at the top to a smaller dimension at the bottom and in this opening a fountain 18 is located, the lower end of the fountain projecting at some distance below the end of the bushing, thus forming the chamber 16 into an annular inclosure at its upper end to contain heated elements to heat the projecting end of the fountain and the liquid as it flows therethrough. The lower end of the fountain has a recess extending upward constituting a valve chamber 19 and a valve recess 20 opens upwardly from this valve chamber with a port 21 leading into and communicating with the fountain tube 7. Inlets 22 extend from the upper side of the fountain into the valve chamber 19, valve rods 23 extending through these inlets and supporting inlet valves 24 at their upper ends, these inlet valves controlling the inlet flow of fluid to the valve chamber 19. An outlet valve is located in the valve chamber 19, this outlet valve including a base 25 and a dome 26 rising therefrom and extending into the valve recess 20, an opening 27 leading from the space within the dome into the valve recess. A valve ring 28 fits the screw threaded wall of the valve chamber 19, this ring having a central opening 30 and ports 29 through the latter of which the liquid may flow into the heating chamber 16. The base 25 of the outlet valve rests upon this ring and by adjusting the position of the ring the location of the inlet valves 24 with respect to the openings 22 may be determined so that these valves may completely close the openings at certain times if desired, or a certain amount of liquid may be permitted to continually flow through said openings, as it will be found that varying conditions may require changes as to this flow of fluid to the heating chamber.

The construction of the recess 20 and the dome 26 is of especial advantage in properly directing the flow of the heated liquid from the heating chamber 16, the inclosed space within the dome being directly over the opening 30 through the ring 28 and the dome thus directing the flow of fluid from said heating chamber and through the recess 20. The action of the outlet valve is extremely sensitive and its operation to control the delivery of fluid to the tube 7 also actuates the valves 24 and thereby provides a measured supply to the heating chamber 16. The dome also prevents any of the heated liquid which has started on its way to the tube 7 from mixing with colder liquid, which might otherwise occur in the initial movement of the valve, which mixing of the liquids is undesirable.

While we have shown and described herein a satisfactory form of apparatus for carrying out our invention the construction herein shown and described may be departed from to a greater or lesser extent and yet be within the spirit and intent of the invention, and we do not therefore confine our invention to a device closely following the construction herein shown.

We claim—

1. A vessel having a heating chamber, a fountain appurtenant to said heating chamber and having an opening for the passage of fluid from the vessel to said chamber, a fountain tube rising from the fountain, and valves rigidly connected and operatively located, one to control flow of liquid through said opening, and the other to control flow of liquid through said tube.

2. A vessel having a holder for material to be treated by liquid and a tube to deliver liquid to said material, a heating plate secured to the bottom of the vessel and having a heating chamber, a fountain projecting into said heating chamber and smaller in diameter than said chamber providing an annular space around said fountain, said fountain having a valve chamber communicating with the heating chamber and openings communicating with the interior of the vessel, and a valve located in the valve chamber to control the flow of fluid, said fountain having a passage extending between the valve chamber and the opening in the fountain tube.

3. A vessel including a holder for material to be treated by liquid, a fountain located at the bottom of the vessel and having a valve chamber with openings therethrough to the interior of the vessel and an outlet passage, a fountain tube connecting said outlet passage with said holder, an outlet valve located in said chamber to control the outlet of fluid therefrom, an inlet valve and a rigid connection between said inlet valve and the outlet valve and positioned to control the flow of fluid to said valve chamber.

4. A vessel including a holder for material to be treated by liquid, a fountain located at the bottom of said vessel and having a valve chamber, a valve ring adjustably located within said chamber, a valve located within said chamber and positioned by said ring to control flow of fluid, said fountain having an outlet passage, and a fountain tube to conduct the fluid from said outlet passage to said holder.

5. A vessel including a holder for material to be subjected to the action of liquid, a fountain located at the bottom of the vessel, said fountain having a valve chamber with an inlet opening thereto and an outlet passage therefrom, a valve ring adjustably located in said chamber, an outlet valve controlling the outlet passage and positioned by said ring, an inlet valve supported to be positioned by said ring to control the inlet opening, and a fountain tube to conduct the fluid from said outlet passage to said holder.

6. A vessel including a holder for material to be treated by liquid, a fountain located at the bottom of the vessel and having a valve chamber with an inlet opening thereto and an outlet passage therefrom, a valve ring adjustably supported in said chamber, said ring having ports therethrough, an outlet valve positioned by said ring within the valve chamber, an inlet valve supported to be positioned by said ring to control the inlet opening to the valve chamber, and a fountain tube to deliver fluid from the outlet passage to said holder.

7. A vessel including a holder for material to be treated by liquid, a fountain located at the bottom of the vessel, a heating plate secured to the bottom of the vessel and having a heating chamber underlying said fountain, said fountain having a valve chamber with an inlet opening thereto and an outlet passage therefrom, a valve ring adjustably located in the valve chamber with a central opening and ports extending between the valve chamber and heating chamber, a valve positioned in the valve chamber to close said central opening and the outlet passage from the valve chamber, an inlet valve, a support for said inlet valve upon the outlet valve said inlet valve controlling said inlet opening and a fountain tube to deliver liquid from said outlet passage to said holder.

8. A vessel including a holder for material to be treated by liquid, a fountain located at the bottom of the vessel and having a valve chamber with an inlet opening thereto and an outlet passage therefrom, and also a valve recess opening out of said valve chamber, a dome shaped valve projecting into said valve recess, and a fountain tube to deliver liquid from said recess to said holder.

9. A vessel including a holder for material to be treated by liquid, a fountain located at the bottom of the vessel and having a valve chamber with an inlet opening thereto and a valve recess opening from its center, a dome shaped valve projecting into said recess and having an opening at the top thereof registering with an outlet passage from said recess, and a tube to deliver liquid from the outlet passage to said holder.

10. A vessel including a holder for material to be treated by liquid, a fountain located at the bottom of the vessel said fountain having a valve chamber with an inlet opening thereto, a valve recess therefrom and an outlet passage communicating with said recess, a valve located in said valve chamber to control flow of fluid to said chamber and a dome shaped valve projecting into said recess with an opening from the top of the dome in line with the outlet passage, and a fountain tube to deliver liquid from the outlet passage to said holder.

11. A vessel including a holder for material to be treated by liquid, a fountain located at the bottom of the vessel and having a valve chamber with a valve recess opening there-out-of, and an outlet passage therefrom and with inlet openings on opposite sides of said outlet passage, a valve to control flow of fluid to said chamber, and a dome shaped projection located in said recess with an opening communicating with the outlet passage and a fountain tube to conduct liquid from said outlet passage to said holder.

12. A vessel including a holder for material to be treated by liquid, a fountain located at the bottom of the vessel and having a valve chamber with a valve recess opening to said chamber and an outlet passage from said recess said valve chamber having an inlet opening, an outlet valve including a base, a dome shaped projection located in said recess with an opening to said outlet passage, an inlet valve to control the inlet to the valve chamber, a support between said inlet valve and the outlet valve, and a fountain tube to conduct liquid from the outlet passage to said holder.

13. A vessel including a holder for material to be treated by liquid, a fountain located at the bottom of the vessel and having a valve chamber with an inlet opening thereto and a valve recess opening thereinto with an outlet passage therefrom, a valve ring adjustably supported in the fountain and having a central opening and ports into said valve chamber, an outlet valve located within said chamber and positioned by said ring and arranged to close the central opening in the ring to inward flow to the heating chamber, said valve having a dome shaped projection into said recess with an opening through said projection to said recess, an inlet valve to control flow through the inlet opening, a support for said inlet valve upon the outlet valve to control the inlet openings to the valve chamber, and a fountain tube to deliver liquid from said fountain to said holder.

14. A vessel including a holder for material to be treated by liquid, a heating plate having a heating chamber of uniform diameter throughout its whole length, a bushing extending through the bottom of the vessel and projecting into said heating chamber, but terminating short of the bottom thereof, said heating plate being secured to said bushing, a fountain located in said bushing and projecting beyond the inner end thereof and forming an annular chamber around the fountain, and a fountain tube to deliver liquid from the fountain to said holder.

15. A vessel having a heating chamber, a fountain appurtenant to said heating chamber and having an opening for the passage of fluid from the vessel to said chamber, a fountain tube rising from the fountain, a valve overlying said opening to control flow of fluid to said chamber, a valve underlying the opening into the fountain tube to control the flow of fluid thereto, and a rigid connection between said valves whereby when the opening to the chamber is closed the tube is open and vice versa.

ISRAEL GEFTER.
SAMUEL GEFTER.

Witnesses:
ARTHUR B. JENKINS,
LOUIS LUCIA.